US012331817B2

United States Patent
Jimenez et al.

(10) Patent No.: US 12,331,817 B2
(45) Date of Patent: Jun. 17, 2025

(54) CENTERING SLEEVE FOR TORQUE CONVERTER ASSEMBLY

(71) Applicant: Schaeffler Technologies AG & Co. KG, Herzogenaurach (DE)

(72) Inventors: Alfredo Perez Mitre Jimenez, Wooster, OH (US); Scott Angel, Marshalville, OH (US); Melissa Blischak, Copley, OH (US); David Lewis, Lexington, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 724 days.

(21) Appl. No.: 17/490,623

(22) Filed: Sep. 30, 2021

(65) Prior Publication Data

US 2023/0093880 A1    Mar. 30, 2023

(51) Int. Cl.
| *F16H 41/24* | (2006.01) |
| *F16D 25/12* | (2006.01) |
| *F16H 41/30* | (2006.01) |
| *F16H 45/02* | (2006.01) |

(52) U.S. Cl.
CPC ............ *F16H 41/30* (2013.01); *F16H 41/24* (2013.01); *F16H 45/02* (2013.01); *F16D 25/12* (2013.01); *F16D 25/123* (2013.01); *F16D 2200/003* (2013.01); *F16D 2250/0007* (2013.01)

(58) Field of Classification Search
CPC ......... F16D 28/123; F16H 41/24; F16H 45/02
See application file for complete search history.

(56) References Cited

U.S. PATENT DOCUMENTS

| 4,257,510 | A  | * | 3/1981  | Fisher     | F16F 15/1215  |
|           |    |   |         |            | 464/84        |
| 4,382,496 | A  | * | 5/1983  | Yamamori   | F16H 61/14    |
|           |    |   |         |            | 192/3.29      |
| 4,976,656 | A  | * | 12/1990 | Bacher     | F16F 15/12346 |
|           |    |   |         |            | 464/68.41     |
| 7,887,240 | B2 | * | 2/2011  | Marathe    | F16C 17/04    |
|           |    |   |         |            | 384/368       |
| 9,151,172 | B2 | * | 10/2015 | Fingerman  | F16H 41/26    |
| 9,593,713 | B2 | * | 3/2017  | Farahati   | F16C 17/04    |
| 9,915,328 | B2 | * | 3/2018  | Moore      | F16H 41/24    |
| 9,917,482 | B2 | * | 3/2018  | Lindemann  | H02K 15/02    |
| 10,539,212 | B2 |  | 1/2020  | Welch      |               |
| 11,879,530 | B2 | * | 1/2024  | Angel      | F16H 45/02    |
| 2005/0091826 | A1 |  | 5/2005 | Fonville   |               |
| 2009/0266665 | A1 | * | 10/2009 | Huegel    | F16H 41/24    |
|              |    |   |         |            | 192/3.29      |
| 2014/0137546 | A1 |  | 5/2014  | Fingerman et al. |        |
| 2015/0323052 | A1 |  | 11/2015 | Moore et al.     |        |
| 2020/0088282 | A1 |  | 3/2020  | Roses et al.     |        |

FOREIGN PATENT DOCUMENTS

JP       5157456 B2    3/2013

* cited by examiner

*Primary Examiner* — Dustin T Nguyen
(74) *Attorney, Agent, or Firm* — Volpe Koenig

(57) ABSTRACT

In one aspect, a centering sleeve is disclosed herein that includes a hub defining a central opening extending in an axial direction between a first axial end and a second axial end. At least one of the first axial end or the second axial end includes a plurality of fluid grooves on an axially outer surface. Both the first axial end and the second axial end can include the plurality of fluid grooves.

12 Claims, 4 Drawing Sheets

CENTERING SLEEVE FOR TORQUE CONVERTER ASSEMBLY

FIELD OF INVENTION

The present disclosure is directed to a centering sleeve for a torque converter assembly.

BACKGROUND

Torque converter assemblies are well known. Within these assemblies, various components are provided in order to provide thrust surfaces, bearing surfaces, and other support surfaces. Specifically, centering sleeves can be implemented in these assemblies that are typically welded to a torque converter cover. Centering sleeves can also be configured to house or surround the input shaft.

Some known techniques for forming centering sleeves include stamping or forging. However, due to the varying functions attributed to the centering sleeve, it is typically expensive to form a centering sleeve that provides sufficient durability for connection to the torque converter cover, as well as its other requisite functions.

SUMMARY

An improved centering sleeve configuration is disclosed herein.

In one aspect, the centering sleeve includes a hub defining a central opening extending in an axial direction between a first axial end and a second axial end. At least one of the first axial end or the second axial end includes a plurality of fluid grooves on an axially outer surface. Both the first axial end and the second axial end can include the plurality of fluid grooves.

In one aspect, the first axial end includes a radially extending flange having a plurality of connection regions. The plurality of connection regions can be formed as an elongated slot having an enlarged end configured to receive a fastener. The radially extending flange extends continuously in a circumferential direction between the plurality of connection regions.

The central opening of the hub is defined by a radially inner surface having at least one first section that defines a flat bearing surface configured to support an input or transmission shaft and the flat bearing surface extends to the second axial end. At least one second section of the radially inner surface can include a curved profile. The least one first section and the at least one second section intersect with each other.

The centering sleeve is formed via casting and formed from aluminum, in one aspect. The hub can include a groove on a radially outer surface that is configured to receive a seal.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Figure 1:
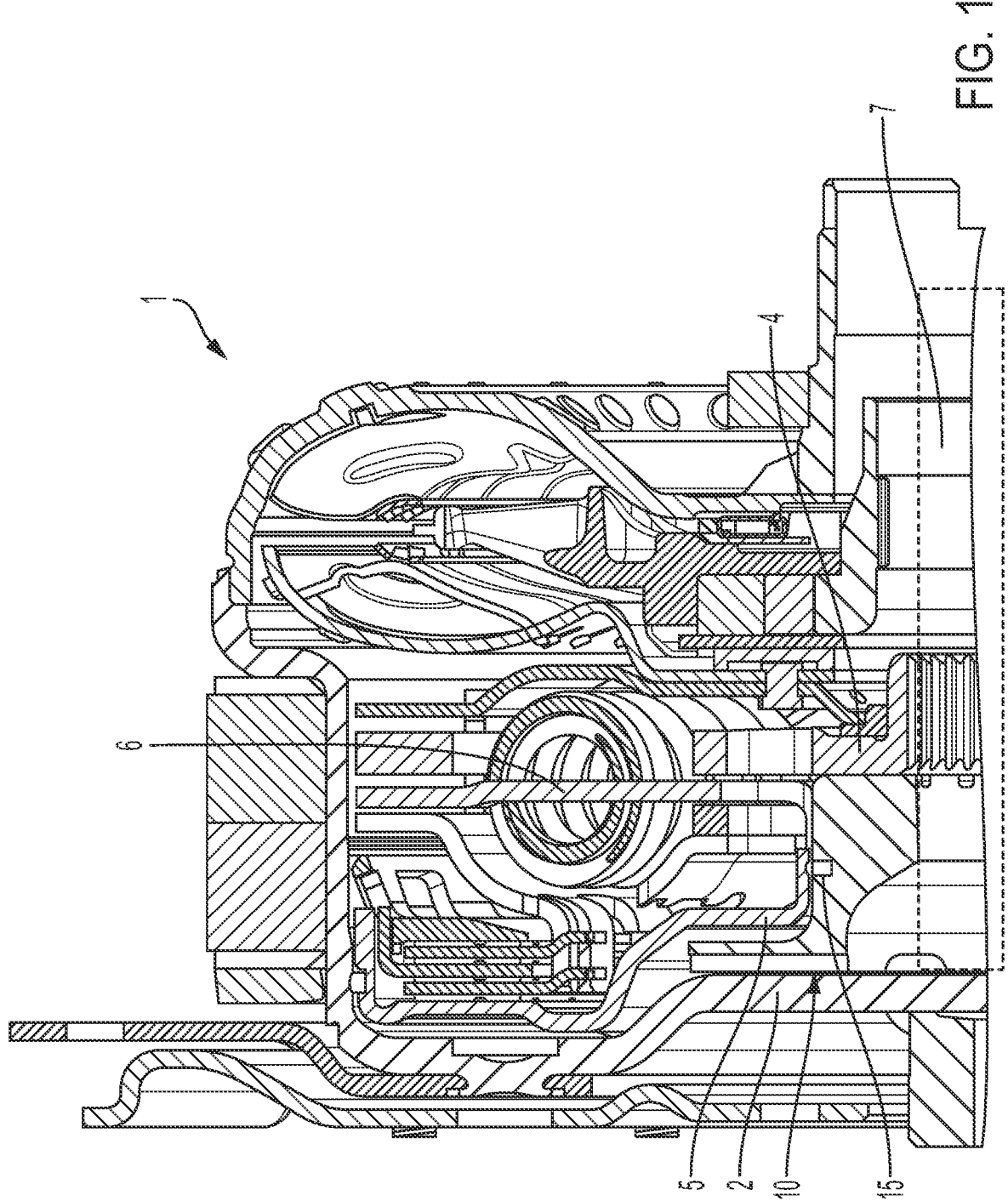
FIG. 1 is a side cross-sectional view of a torque converter assembly according to one aspect.
Figure 2:
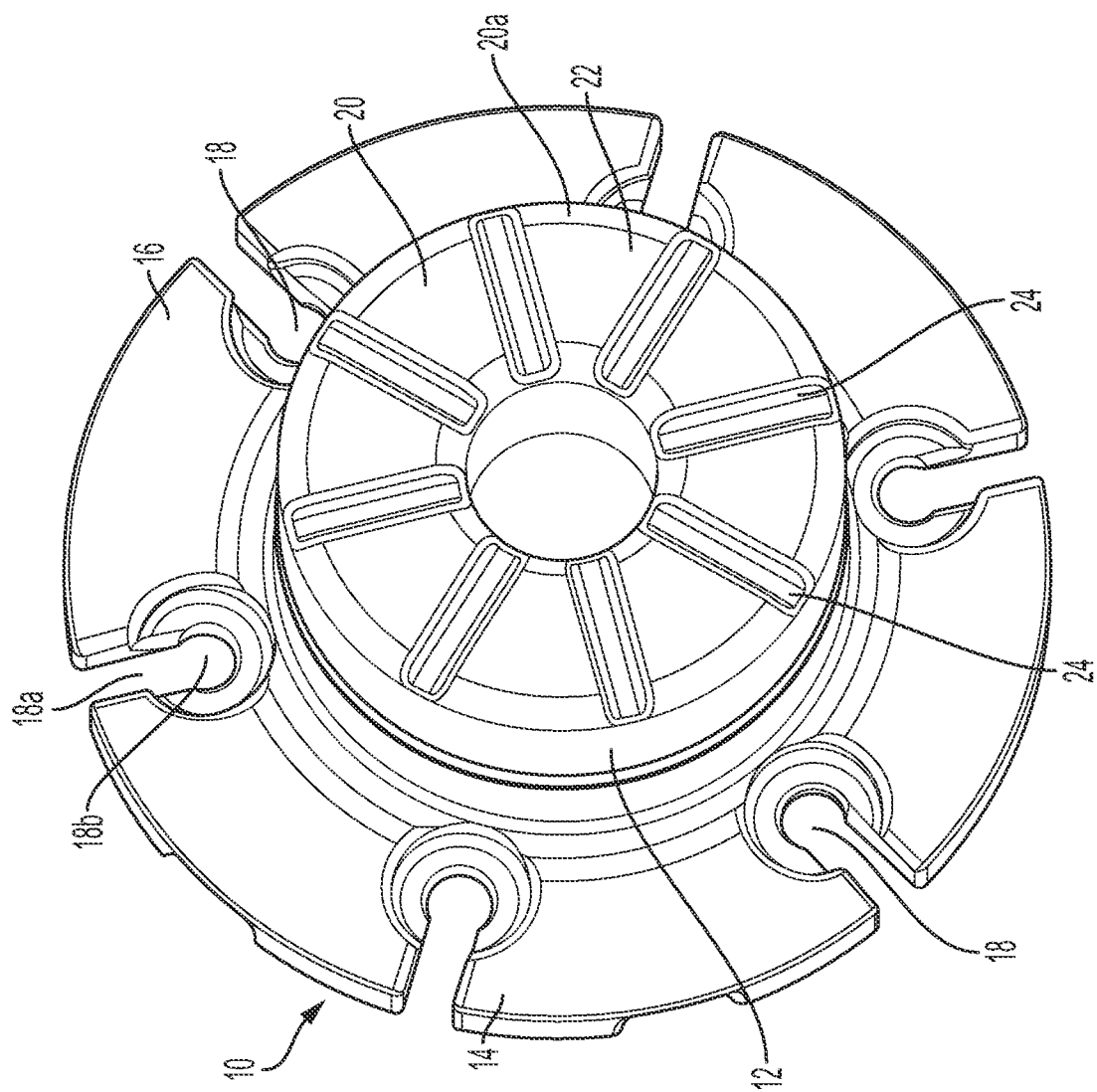
FIG. 2 is a perspective view of a centering sleeve for the torque converter assembly of FIG. 1.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

A torque converter assembly 1 is generally shown in FIG. 1 that includes a centering sleeve 10. As also shown in FIG. 1, the torque converter assembly 1 also includes a torque converter cover 2, a damper flange 4, a piston 5, a secondary damper flange 6 and an input or transmission shaft 7. The centering sleeve 10 generally engages axial end faces of the torque converter cover 2 and the damper flange 4. One of ordinary skill in the art would understand that the components of the torque converter assembly 1 can vary.

In one aspect, the centering sleeve 10 is adapted or configured to be used in a torque converter assembly. One of ordinary skill in the art would understand that the centering sleeve 10 can be configured to be used in other types of assemblies.

In one aspect, the centering sleeve 10 is formed via casting. The centering sleeve 10 can be formed as a die cast aluminum component.

The centering sleeve 10 generally includes a hub 12 or main body portion. The hub 12 defines a central opening 13 that extends along an axial direction. The central opening 13 can extend between opposing axial ends (i.e. a first axial end 14 and a second axial end 20) of the hub 12. At least one of the axial ends 14, 20 includes a plurality of fluid grooves 17, 24. In one aspect, the fluid grooves 17, 24 are defined on axially outer surfaces of the centering sleeve 10.

In one aspect, the first axial end 14 includes a radially extending flange 16, which generally extends outwardly in the radial direction. The radially extending flange 16 defines a plurality of connection regions 18. The connection regions 18 can define an open-ended slot that is open in a radially outer direction. In one aspect, the connection regions 18 are formed as an elongated slot 18a having an enlarged end 18b configured to receive a fastening element, fastener, or other connection element. The profile of the connection regions 18 can vary. Each of the connection regions 18 can be configured to allow for connection to the torque converter cover 2 via fastening elements, fasteners or other connection elements. For example, stamped extruded rivets can be used to secure the centering sleeve 10 to the torque converter cover 2 or any other torque converter component. In one aspect, the connection regions 18 can be considered rivet holes. One of ordinary skill in the art would understand that various types of connection arrangements can be used.

The radially extending flange 16 extends continuously in a circumferential direction between the connection regions 18. Based on this configuration, the radially extending flange 16 is uninterrupted between the connection regions 18. This particular configuration provides for stress reduction by improving the strength of the centering sleeve 10.

Figure 4:
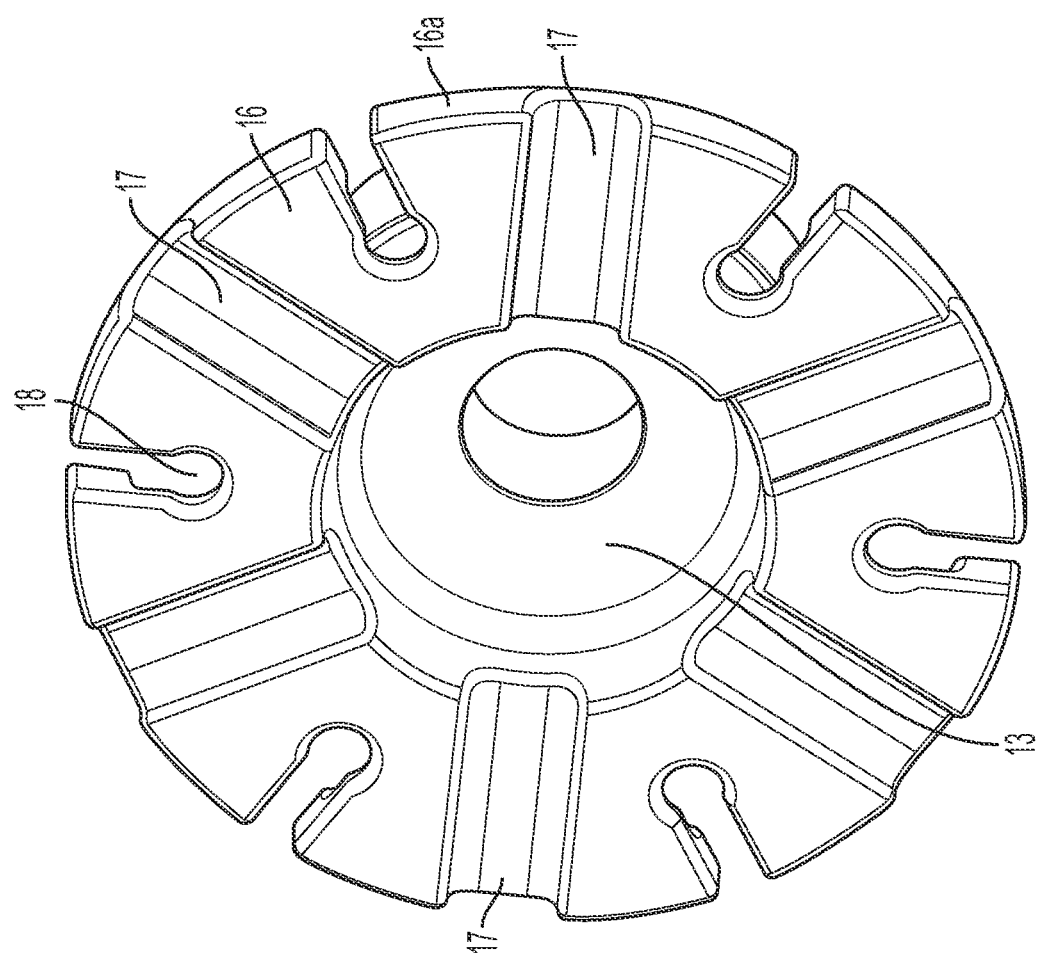
FIG. 4 is a rear view of the centering sleeve of FIGS. 2 and 3.

The outer or rear side (i.e. the axially outer surface) of the radially extending flange 16 is used to provide structure for fluid grooves 17. As shown in FIG. 4, the fluid grooves 17 extend in a radial direction between the central opening 13 and a radially outer edge 16a of the radially extending flange 16. One of the fluid grooves 17 can be arranged between adjacent pairs of the connection regions 18, in one aspect. In one aspect, there are at least six fluid grooves 17. Additional or fewer fluid grooves 17 can be provided. The fluid grooves 17 can be configured to direct fluid, such as automatic transmission fluid (ATF) from the input or transmission shaft 7 to flow behind the piston 5 and build pressure in a space defined between the piston 5 and the torque converter cover 2.

The second axial end 20 includes a second plurality of fluid grooves 24 on an axially outer thrust surface 22, in one aspect. The fluid grooves 24 extend between the central opening 13 and a radially outer edge 20a of the second axial end 20. In one aspect, there are at least six fluid grooves 24. Additional or fewer fluid grooves 24 can be provided. The fluid grooves 24 can be configured to allow for fluid film generation during rotation when the centering sleeve 10 is thrust against a mating surface. These fluid grooves 24 therefore help prevent wear while the centering sleeve 10 engages against the damper flange 4.

In one aspect, both the first axial end 14 and the second axial end 20 include the plurality of fluid grooves 17, 24, and the fluid grooves 17, 24 are defined on opposite axially outermost faces of the centering sleeve 10.

Figure 3:
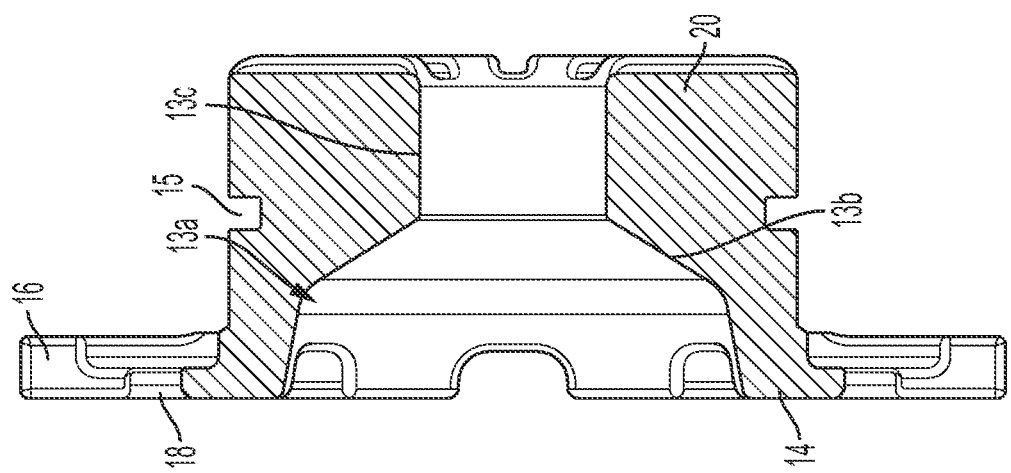
FIG. 3 is a side view of the centering sleeve of FIG. 2.

The central opening 13 of the hub 12 is defined by a radially inner surface 13a that includes at least a first section 13b and a second section 13c. The second section 13c defines a bearing surface configured to support the input or transmission shaft 7. As shown in FIG. 3, the second section 13c has a completely flat profile. The second section 13c can be configured to act as a bushing surface to pilot the input or transmission shaft 7. The second section 13c is configured to directly engage with the input or transmission shaft 7. The second section 13c extends from the second axial end 20 to the first section 13b of the radially inner surface 13a. In one aspect, the input or transmission shaft 7 is formed from steel, and the centering sleeve 10 is formed from a non-steel material, such as aluminum.

The first section 13b of the radially inner surface 13a has a sloped or curved surface. The first section 13b is defined between the first axial end 14 and the second section 13c of the radially inner surface 13a. The first section 13b can extend for a majority of the radially inner surface 13a. In one aspect, the first section 13b extends from the first axial end 14 to a medial region of the radially inner surface 13a. In one aspect, the radially inner surface 13a consists only of the two sections 13b, 13c. The second section 13c (i.e. the bearing section) is preferably thicker than the first section 13b. In one aspect, the first section 13b provides a surface or geometry that is specifically configured to avoid trapping water or contamination during machining and washing processes. In other words, the shape of the first section 13b provides manufacturing efficiencies by avoiding any sharp edges or corners which may trap debris or fluid during the formation process. In one aspect, the hub 12 includes a groove 15 on a radially outer surface that is configured to receive a seal.

Figure 7:
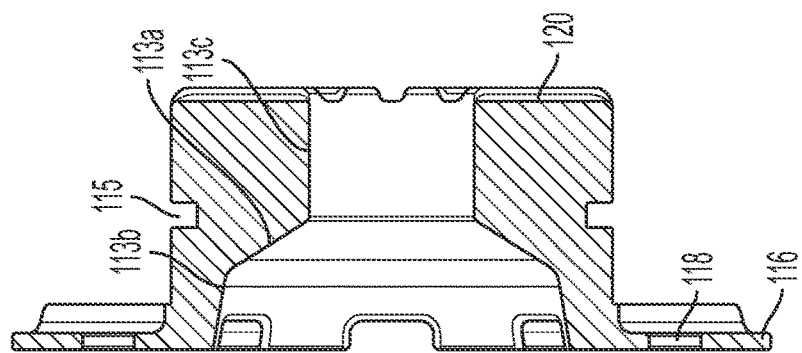
FIG. 7 is a side-cross-sectional view of the centering sleeve of FIGS. 5 and 6.
Figure 6:
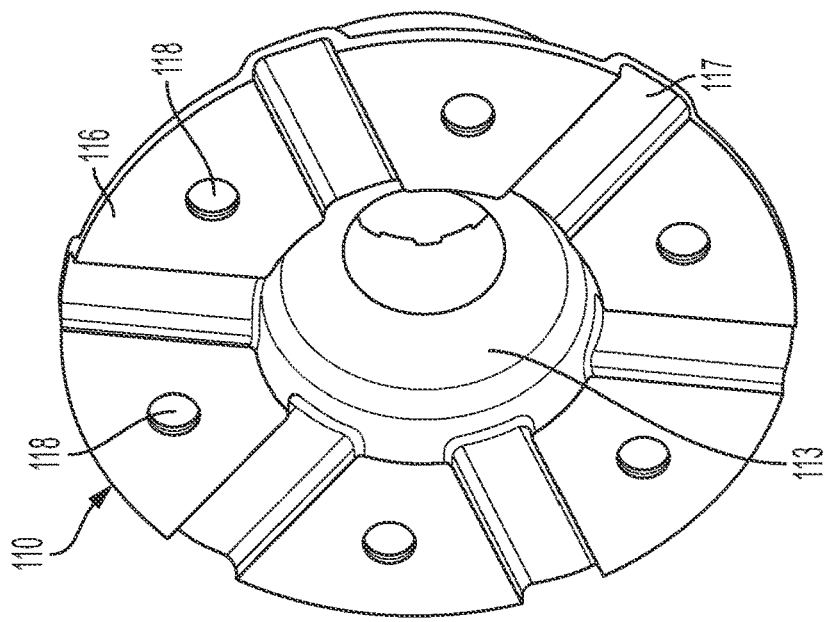
FIG. 6 is a rear perspective view of the centering sleeve of FIG. 5.
Figure 5:
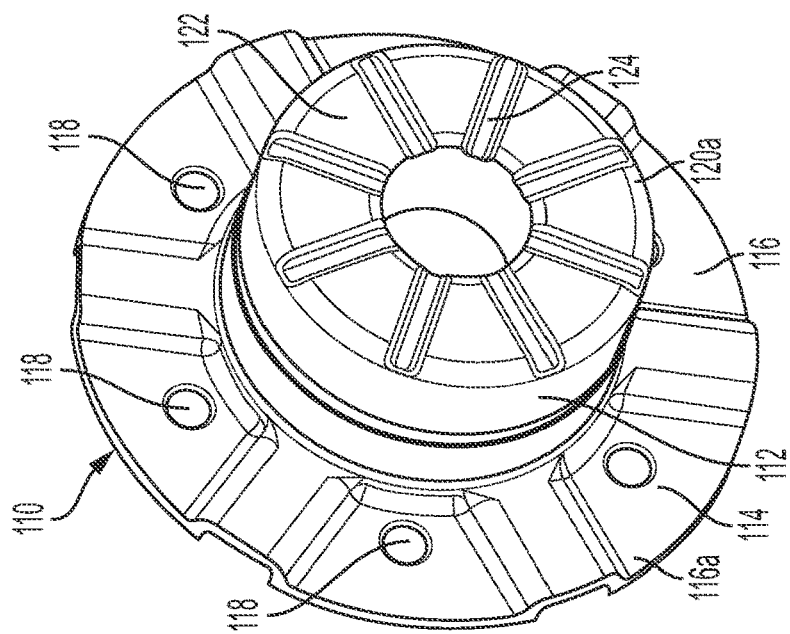
FIG. 5 is a front perspective view of another aspect a centering sleeve.

FIGS. 5-7 illustrate another aspect of a centering sleeve 110. As shown in FIGS. 5-7, the centering sleeve 110 has some differences from the centering sleeve 10 but includes many of the same features. Unless specified herein, the centering sleeves 10, 110 are identical to each other, and like elements are indicated with like reference numerals and are not necessarily specifically described in more detail. As shown in FIGS. 5-7, the centering sleeve 110 includes a radially extending flange 116 having a plurality of connection regions 118. The centering sleeve 110 differs from the centering sleeve 10 in that the plurality of connection regions 118 are enclosed openings and are not formed as elongated slots with openings in a radial direction. In a circumferential direction between the connection regions 118, the radially extending flange 116 is continuous and non-interrupted.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

Torque converter assembly 1
Torque converter cover 2
Damper flange 4
Piston 5
Secondary damper flange 6
Shaft 7
Centering sleeve 10, 110
Hub 12, 112
Central opening 13, 113
Radially inner surface 13a, 113a of hub
First region 13b, 113b of radially inner surface
Second region 13c, 113c of radially inner surface
First axial end 14, 114
Groove 15, 115
Radially extending flange 16, 116
Radially outer edge 16a, 116a of the radially extending flange
First plurality of fluid grooves 17, 117
Connection regions 18, 118
Second axial end 20, 120
Radially outer edge 20a, 120a of the second axial end
Axially outer thrust surface 22, 122
Second plurality of fluid grooves 24, 124

What is claimed is:

1. A centering sleeve for a torque converter assembly, the centering sleeve comprising:

a hub defining a central opening extending in an axial direction between a first axial end and a second axial end;

wherein the first axial end includes a radially extending flange having a plurality of openings defining connection regions for connection to a torque converter cover; and wherein the radial flange includes a plurality of fluid grooves on an axially outer surface extending in a radial direction between the central opening and a radially outer edge of the radially extending flange;

wherein the second axial end includes a plurality of fluid grooves on an axially outer thrust surface.

2. The centering sleeve according to claim 1, wherein the plurality of connection regions are formed as an elongated slot having an enlarged end configured to receive a fastener.

3. The centering sleeve according to claim 1, wherein the plurality of connection regions are formed as enclosed openings.

4. The centering sleeve according to claim 1, wherein the radially extending flange extends continuously in a circumferential direction between the plurality of connection regions.

5. The centering sleeve according to claim 1, wherein the central opening of the hub is defined by a radially inner surface having at least one first section that defines a flat bearing surface configured to support an input or transmission shaft, wherein the flat bearing surface extends to the second axial end.

6. The centering sleeve according to claim 5, wherein at least one second section of the radially inner surface includes a curved profile.

7. The centering sleeve according to claim 6, wherein the at least one first section and the at least one second section intersect with each other.

8. The centering sleeve according to claim 1, wherein the centering sleeve is formed via casting.

9. The centering sleeve according to claim 1, wherein the centering sleeve is formed from aluminum.

10. The centering sleeve according to claim 1, wherein the hub includes a groove on a radially outer surface that is configured to receive a seal.

11. The centering sleeve according to claim 1, wherein the first axial end and the second axial end extend in parallel planes.

12. A centering sleeve for a torque converter assembly, the centering sleeve comprising:

a hub defining a central opening extending in an axial direction between a first axial end and a second axial end;

wherein at least one of the first axial end or the second axial end includes a plurality of fluid grooves on an axially outer surface;

wherein the first axial end includes a radially extending flange having a plurality of connection regions; and wherein the plurality of connection regions are formed as an elongated slot having an enlarged end configured to receive a fastener.

* * * * *